INVENTOR.
WARNOCK M. McILWAINE,
BY
ATTORNEY.

Patented Dec. 25, 1951

2,579,947

UNITED STATES PATENT OFFICE 2,579,947

CANVAS AWNING ATTACHMENT

Warnock M. McIlwaine, San Pedro, Calif.

Application December 2, 1949, Serial No. 130,837

2 Claims. (Cl. 160—45)

This invention relates to a canvas awning attachment, particularly for the awnings which are mounted on automobile trailers or on house awnings, whereby the awning is held taut.

An object of my invention is to provide a novel means of attaching the tubular roof member of the awning to the canvas awning itself, whereby the canvas may be properly tensioned and held against sagging.

A feature of my invention is to provide a novel canvas awning attachment which is permanently secured to the canvas adjacent one edge thereof, and is thus always available when the awning is to be assembled.

Another feature of my invention is to provide a novel canvas awning attachment which is simple in construction, inexpensive to manufacture, and which is effective in use.

Other objects, advantages and features of invention may appear from the accompanying drawing, the subjoined detailed description and the appended claims.

Figure 1:
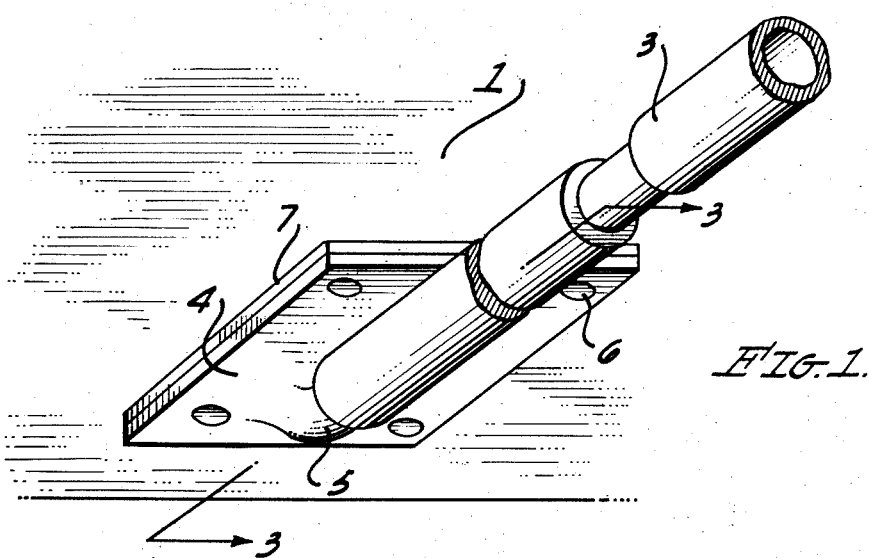
Figure 1 is a perspective view of my canvas awning attachment.
Figure 2:
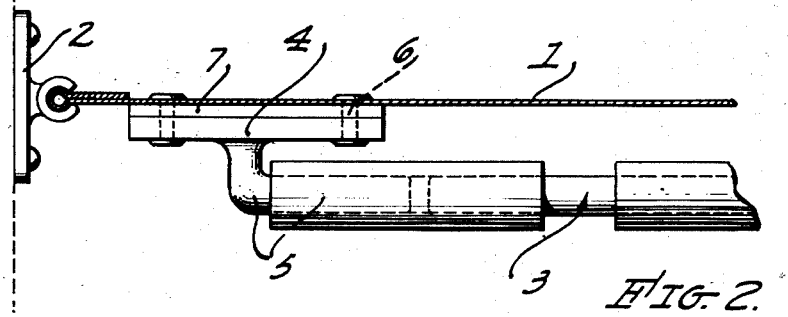
Figure 2 is a side elevation of the same.
Figure 3:
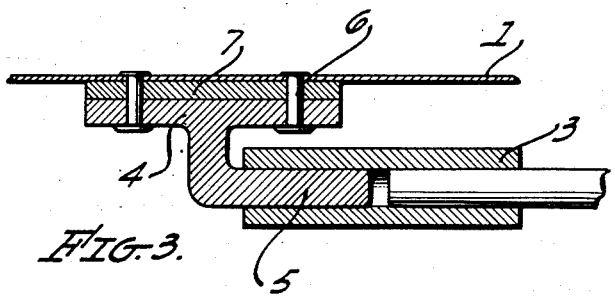
Figure 3 is a sectional view taken on line 3—3 of Figure 1.

Referring more particularly to the drawing, the numeral 1 indicates the canvas awning which is attached to a trailer, a building, or the like, by means of a suitable rail 2 attached to the trailer, building or the like. This rail is usual and well known in the art, and is commonly used on automobile trailers, as shown in Patent No. 2,423,402, dated July 1, 1947.

The roof member 3 of the awning is preferably tubular and in any event the end of the roof member is tubular, as will be further described.

In order that the roof member 3 may be secured to the canvas 1, I provide a plate 4, formed of suitable metal, and this plate is formed with an integral finger 5, which projects substantially horizontally and enters the tubular roof member 3, substantially as shown. The parts 4 and 5 may be cast as an integral part, or the finger 5 may be stamped from the metal of the plate 4, thus providing in either event the necessary projection upon which the tube 3 can fit. The plate 4 is fixedly attached to the canvas awning 1 by means of rivets, or the like, 6, and a strip of leather, heavy fabric, or the like, 7, is interimposed between the plate 4 and the canvas awning 1, so that the metal plate will not wear the canvas.

In use, the metal plate 4 is fixedly secured to the bottom face of the canvas awning 1. It is preferably placed adjacent the rail 2, to which the awning is attached. The finger 5 is then inserted in the roof member 3, as shown, and the required tension is applied to the roof member 3, either through the spring which engages the roof member, or other suitable means. In trailer awnings, a spring is usual and well known in the art, and is shown in my co-pending application, Serial No. 130,836, filed December 2, 1949. The longitudinal tension in the roof member 3 is transmitted through the finger 5 to the plate 4, and thus to the canvas 1, thus holding the roof portion of the awning taut at all times.

Having described my invention, I claim:

1. A canvas awning including a tubular roof member, and an attachment engageable with the tubular roof member, comprising a plate, means securing said plate to the canvas awning, a finger on said plate, said finger extending into the end of the tubular roof member.

2. A canvas awning including a tubular roof member, and an attachment for engagement with the tubular roof member, comprising a plate, a finger projecting from said plate and integrally formed therewith, means securing said plate to the canvas awning, said finger projecting into the end of the tubular roof member.

WARNOCK M. McILWAINE.

REFERENCES CITED

The following references are of record in the file of this patent:

UNITED STATES PATENTS

| Number | Name | Date |
|--------|------|------|
| Re. 18,940 | Traut | Sept. 5, 1933 |
| 2,138,219 | Tabb | Nov. 29, 1938 |
| 2,154,161 | Heckman | Apr. 11, 1939 |
| 2,423,402 | Olsen | July 1, 1947 |